United States Patent [19]

MacLean et al.

[11] Patent Number: 4,539,303
[45] Date of Patent: Sep. 3, 1985

[54] PROCESS FOR IMPROVING POWER RECOVERY FROM REGENERATION GAS UNDER TURNDOWN CONDITIONS

[75] Inventors: John P. MacLean, Stafford; Joel S. Bittensky; James H. Colvert, both of Houston, all of Tex.

[73] Assignee: Texaco Inc., White Plains, N.Y.

[21] Appl. No.: 559,058

[22] Filed: Dec. 7, 1983

Related U.S. Application Data

[63] Continuation-in-part of Ser. No. 306,048, Sep. 28, 1981, abandoned, which is a continuation-in-part of Ser. No. 141,454, Apr. 18, 1980, abandoned, which is a continuation-in-part of Ser. No. 920,100, Jun. 28, 1978, abandoned.

[51] Int. Cl.³ .................... B01J 21/20; B01J 29/38; C10G 11/00; F02C 9/02
[52] U.S. Cl. .................... 502/39; 60/39.02; 60/39.03; 208/113; 502/41; 502/42
[58] Field of Search .................... 502/39–43; 208/113, 164; 60/39.02, 39.03

[56] References Cited

U.S. PATENT DOCUMENTS

| | | | |
|---|---|---|---|
| 3,137,133 | 6/1964 | Wilson et al. | 502/39 |
| 3,855,788 | 12/1974 | Damratowski | 60/39.03 |
| 4,081,508 | 3/1978 | Luckenbach | 502/39 |
| 4,176,084 | 11/1979 | Luckenbach | 208/164 |
| 4,324,688 | 4/1982 | Castagnus, Jr. et al. | 502/42 |
| 4,341,623 | 7/1982 | Bertolacini et al. | 502/42 |

*Primary Examiner*—P. E. Konopka
*Attorney, Agent, or Firm*—Jack H. Park; Kenneth R. Priem; Richard A. Morgan

[57] ABSTRACT

An improved process for recovering energy via an expander turbine axial flow gas compressor set which utilizes hot regeneration gas recovered from the regeneration of fluidized catalytic cracking catalyst, and during turndown conditions when the output of the gas compressor is required to be increased by an excess amount to prevent surge and the excess amount is normally vented to the atmosphere prior to entering the regenerator to prevent afterburn, the process including the steps of:

(1) adjusting air compressor air rate set point to at least 10% above surge; thereby
(2) increasing air rate to an amount in excess of regeneration requirement;
(3) flowing all air compressed to the regenerator;
(4) by use of complete combustion catalyst, oxidizing essentially all coke to carbon dioxide,
(5) driving the expander with all the hot flue gas produced and thereby;
(6) driving the motor-generator thereby generating electricity.

3 Claims, 4 Drawing Figures

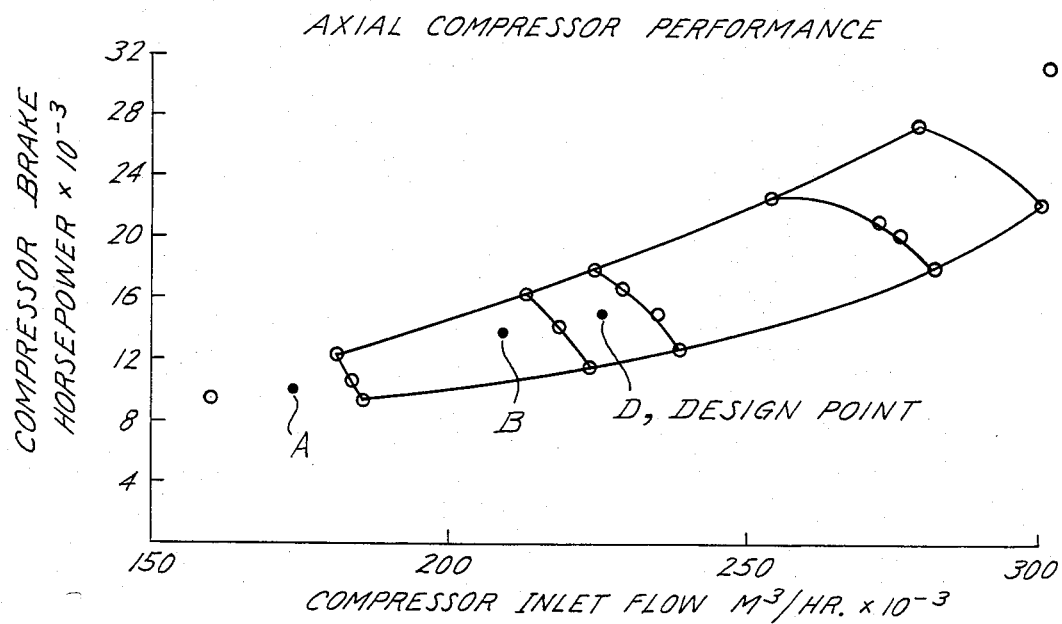
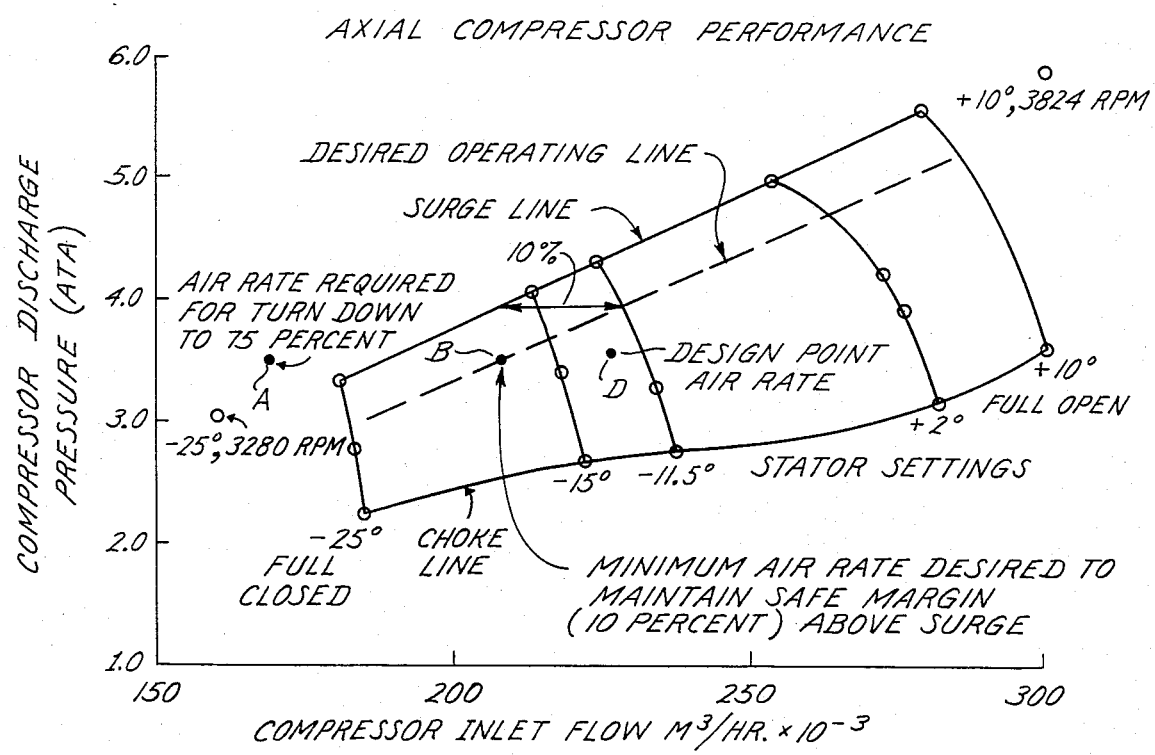

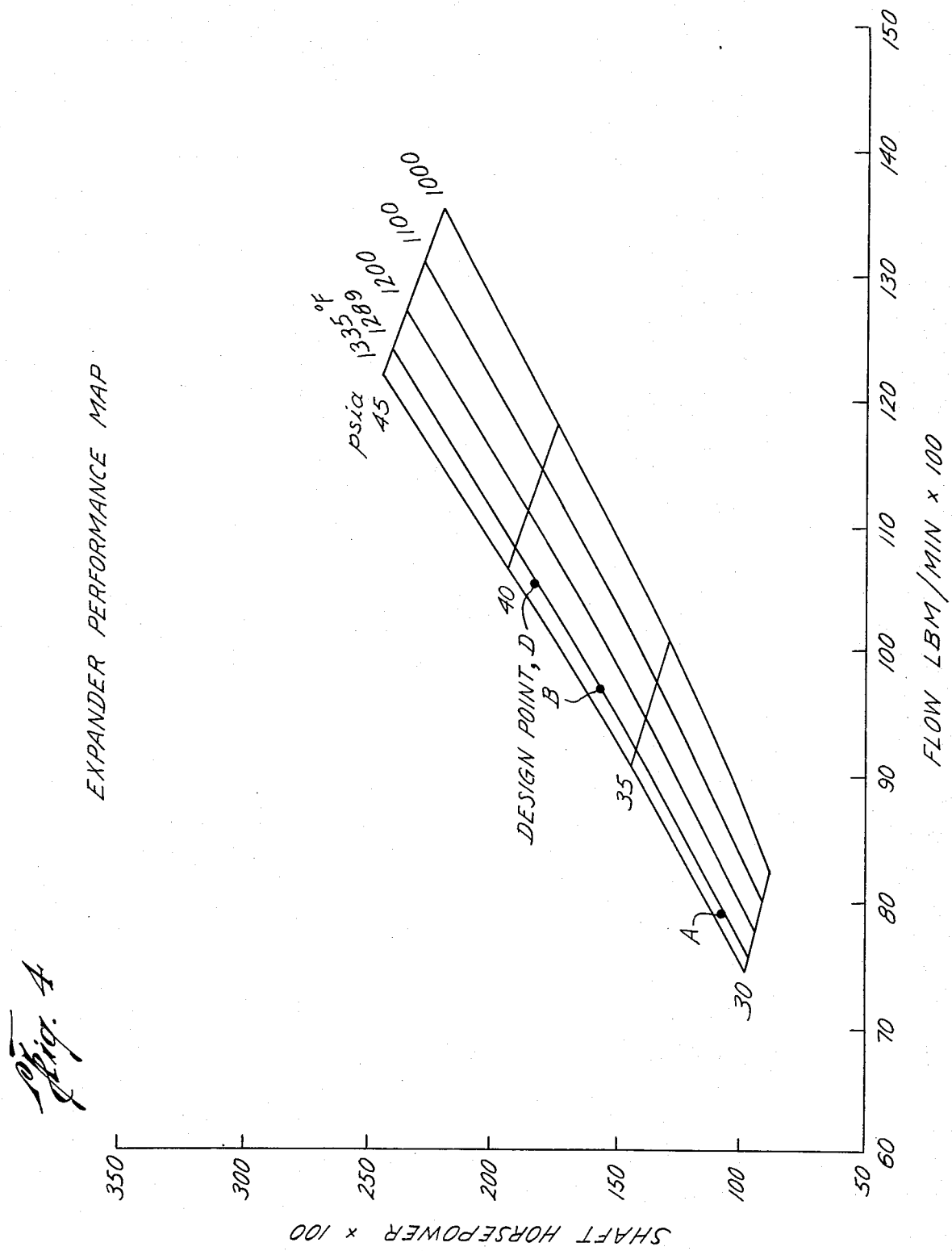

PROCESS FOR IMPROVING POWER RECOVERY FROM REGENERATION GAS UNDER TURNDOWN CONDITIONS

CROSS REFERENCE TO RELATED APPLICATIONS

This application is a continuation-in-part of pending application Ser. No. 06/306,048, filed Sept. 28, 1981, now abandoned. Ser. No. 06/306,048 is a continuation-in-part of application Ser. No. 06/141,454 filed Apr. 18, 1980, now abandoned. Ser. No. 06/141,454 is a continuation-in-part of application Ser. No. 06/920,100 filed June 28, 1978, now abandoned.

BACKGROUND OF THE INVENTION

The present invention relates to a process for the regeneration of spent catalyst from a fluid catalytic cracking unit (FCCU). More particularly, the invention relates to the recovery of power from hot regeneration gases recovered from such regeneration process.

In a typical FCCU, spent catalyst is continuously removed from the reactor, sent to the regenerator, and then returned to the reactor. In the regenerator, the fouled catalyst is contacted with an oxidative regeneration gas, at elevated temperatures and pressures, to remove coke or other carbonaceous deposits from the catalyst by combustion.

Such combustion of carbonaceous deposits can be effected in a fluidization chamber containing the solid catalyst particles through which a fluidizing gas is passed upwards at a rate to maintain the particles as a fluidized bed, i.e. in a turbulent state with quasi liquid properties, including a recognizable upper level. Fluidization distributes the fluidized catalyst into a lower dense phase and an upper dilute phase. Typically, the fluidizing gas is, or at least contains, the oxidative regeneration gas. The combustion or regeneration gases produced by the burning of the carbonaceous deposits are typically at high temperatures and elevated pressures. For example, it is not uncommon for regeneration gases to have a temperature in excess of 1000° F. and range up to 1500° F., or even higher, while pressures may range from about 10 psig up to about 35 psig and greater. Thus the gases, commonly referred to as flue gas, emerging from the regeneration zone represent a large energy potential which may be utilized to recoup a part of the power expended in the system in compressing the air used as the oxidative regeneration gas. In some cases, enough energy is released in the regeneration process that, if properly recovered, a net gain may be realized in the regeneration, thus supplying a surplus of power for utilization in other operations, e.g. generation of electric power.

It is common practice to utilize expansion turbines or turbo expanders to recover energy from hot flue gases from regenerators. In the usual case, the flue gas, at high temperature and elevated pressure, is passed to an expansion turbine which then supplies shaft power to an air compressor used to generate compressed air for the regeneration process. Shaft power in excess of air compressor requirements is used to drive a motor-generator capable of generating electricity.

There have recently been developed fluid catalytic cracking catalysts which allow essentially complete combustion of the carbonaceous material on the spent catalyst to carbon dioxide in the dense phase zone of the regenerator, essentially no carbon monoxide being produced. The use of such catalyst is highly desirable as it prevents undesirable afterburn in the regenerator dilute phase zone, a condition brought on by the presence of both carbon monoxide and regeneration gas in the dilute phase. Additionally with the use of these catalysts, all heat of combustion may be utilized with the fluid catalytic cracking process rather than being lost completely or recovered externally of the regenerator in a carbon monoxide boiler. The latter process is disclosed, for example, in U.S. Pat. Nos. 3,137,133 and 3,139,726. The use of complete combustion catalysts, which allow increased recovery of heat of combustion, provides a higher regenerative dense phase zone temperature and thereby allows lower catalyst to oil ratios in the cracking zone and hence improved yields. As noted, the hot flue gases from the regeneration zone are typically expanded through the expansion turbine of an expander turbine-compressor set to recover energy from the flue gas. While centrifugal flow compressors or turbo blowers may be used in such a power recovery set, axial flow compressors, because of their high efficiency and higher capacity, offer certain advantages. There is, however, a distinct problem with the use of axial flow compressors in such systems. Because of the relatively steep head-capacity-characteristics of axial flow compressors, the surge point may be close to, i.e. within 10% to 30% of the design flow. This characteristic of axial flow compressors makes them susceptible to surging, i.e. unless the axial flow compressor is operated under conditions where it is required to compress more air than needed on the discharge side, the compressor will begin to surge. There is a minimum capacity for axial flow blowers below which operation becomes unstable, i.e. surging occurs. Surging results when the line pressure on the exhaust side of the compressor exceeds the exhaust pressure which the machine is capable of producing. Since the compressed gas cannot get into the outlet or exhaust line, it rushes back into the compressor. This lowers the outlet line pressure momentarily and the compressor begins to, once again, discharge into the outlet line. However, the pressure immediately gets too high in the outlet line and, again, the air cannot be discharged from the compressor. The gas then rushes back into the compressor and the entire cycle is repeated. Continued operation of a compressor under surging conditions will eventually cause the compressor to tear itself apart.

Surging in axial flow compressors can become a serious problem in fluid catalytic cracking (FCC) processes because at times, it is desirable to operate the unit under turndown conditions. In turndown conditions, the amount of feed stock to the FCCU is reduced to below design capacity which results in a low flow of the spent catalyst to the regenerator through line 10. This means that the amount of catalyst being regenerated, and accordingly the amount of compressed regeneration gas (air) being used in the regenerator and resultant hot flue gas produced is reduced. It also means that less compressor capacity is required. It has been customary practice in turndown and when using axial compressors, to require the compressor to compress more gas than needed for the regeneration process and vent the excess at the blower discharge via discharge valve 34 and line 32. While this practice prevents surging of the compressor, it represents a loss of recoverable energy in the system. Likewise, this venting of the excess blower discharge prevents excessive afterburning of CO in the dilute phase zone of the regenerator and the resultant excessive heating in the dilute phase zone when not operating under the high temperature regeneration mode.

BRIEF SUMMARY OF THE INVENTION

The present invention is an improved process for recovering power from hot regeneration gases derived from the regeneration of spent, fluid catalytic cracking catalysts.

The present invention represents an improvement in the field of regeneration of spent catalyst from a fluidized catalytic cracking process, and more specifically, an improvement in the recovery of energy from the hot regeneration gases derived therefrom. In the conventional process, the spent catalyst is contacted with a regeneration gas, typically air, in a regeneration zone, at elevated pressures and temperatures, to effect burning of carbonaceous material deposited on the spent catalyst. Hot regeneration gases and regenerated catalyst are separated and a hot flue gas is recovered. The flue gas is expanded through the turbine of an expander turbine axial flow gas compressor set, the energy recovered by the expander being used to drive the compressor which in turn compresses oxygen-containing gas which is fed to the regenerator as regeneration gas.

During turndown conditions in such a process, the output of the air compressor is required to be increased by an amount in excess of regeneration requirements to prevent surge and the excess air is vented to the atmosphere at the compressor discharge to prevent afterburn in the regenerator.

In contrast, in the present process air compressor discharge air rate set point is adjusted to at least 10% above the rate at which surge would occur and typically 10% above surge to 100% of design rate. This causes an amount of air in excess of regeneration requirements to be compressed. All of this compressed air is flowed to the regenerator. Complete combustion catalyst is used in the process. When coke contaminated complete combustion catalyst is exposed to the excess air, essentially all the coke is oxidized in the dense catalyst phase, without afterburn and thereby producing an essentially carbon monoxide free flue gas. All produced flue gas is used to drive the expander power recovery turbine which in turn drives the air compressor and the electric generator. An increase in power recovery is experienced.

BRIEF DESCRIPTION OF THE DRAWING

The FIG. 1 is a schematic flow sheet depicting the process of the present invention.

FIGS. 2, 3 and 4 are performance maps for a typical expander power recovery turbine/axial flow air compressor set. Those maps present the areas in which the blower and the expander are operable.

DETAILED DESCRIPTION OF THE DRAWINGS

Figure 1:
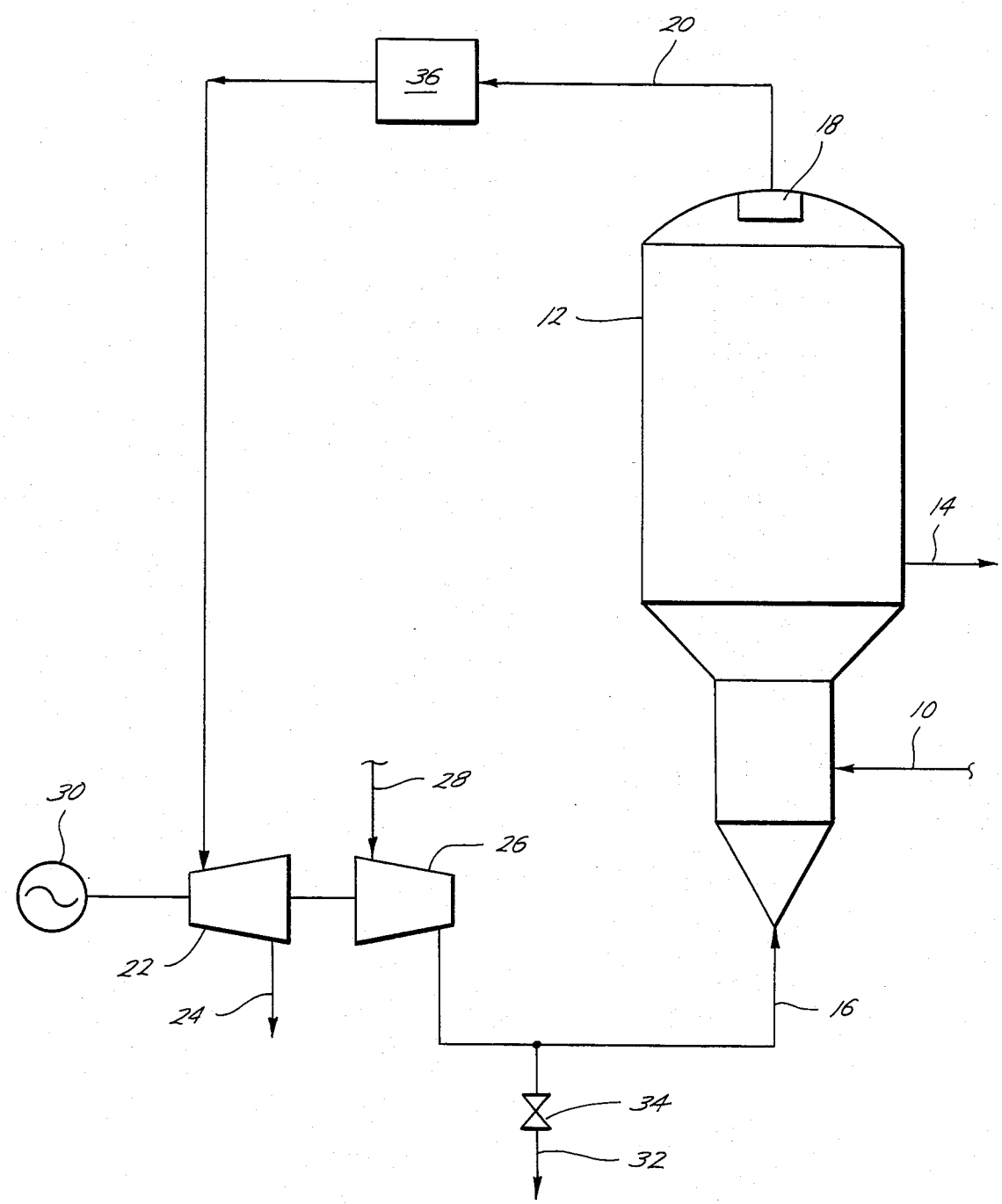

Referring to FIG. 1, fouled or spent catalyst from a fluidized catalytic cracker (not shown) is introduced, via line 10, into regenerator 12. This spent complete combustion catalyst from a typical FCCU contains deposits of coke and tarry residues, i.e. carbonaceous material, which inhibit the cracking activity of the catalyst.

Oxidative regeneration gas, such as compressed air or other oxygen-containing gas, is introduced into regenerator 12 via line 16. The oxidative regeneration gas is passed upwardly through regenerator 12 at a rate sufficient to maintain the catalyst particles in a fluidized or turbulent state with quasi liquid properties, a recognizable lower level defining the dense phase zone in regenerator 12. In regenerator 12, conditions are such that substantially all of the carbon monoxide produced by combustion of the carbonaceous material is converted to carbon dioxide. As previously noted, this can be accomplished, in one manner, by the use of so-called complete combustion catalysts. Such catalysts allow essentially complete combustion of the carbonaceous material deposited on the spent catalyst to carbon dioxide in the regenerator dense phase zone. Thus, the hot regeneration gases leaving the dense phase zone of the regenerator 12 contain little or no carbon monoxide which can cause afterburn in the upper dilute phase zone of the regenerator, or in the gas/solid separator used to remove entrained catalyst from the hot regeneration gases. Generally speaking, temperatures in the regenerator will range from about 1100° to about 1500° F. Additionally, the oxidative regeneration gas supplied usually contains oxygen in excess of the stoichiometric amount necessary to convert the carbonaceous material to carbon dioxide. The hot regeneration gases produced by the combustion in regenerator 12 pass through a separating system 18, which may consist of one or more cyclones which serve to remove entrained catalyst particles from the hot regeneration gases. The regenerated catalyst, enhanced in cracking activity, is then returned to the reactor by way of line 14.

The hot flue gases, i.e. the gases generated in the combustion in regenerator 12 and which have been substantially freed of solid catalyst particles in separating system 18 leave regenerator 12 via line 20, pass through the external solids separator 36, and are introduced into expander turbine 22 which exhausts the expander gases, via line 24, to the atmosphere or other energy recovery means, e.g. a steam generator or the like. Expander turbine 22 serves to produce available rotative power in proportion to the pressure level of the overall system. In the case shown, expander turbine 22 forms a part of the expander-compressor set, and is linked, via a direct drive connection, to a corresponding axial flow gas compressor 26. Gas compressor 26 takes in atmospheric air or other oxygen-containing gas via line 28 and compresses it to the pressure required in regenerator 12. Sufficient oxygen-containing gas, e.g. air, is compressed in compressor 26 to prevent surging. Generally speaking, the amount of oxygen-containing gas or air compressed is sufficient to maintain the compressed gas discharged from compressor 26 at a rate at least about 10% above the rate at which compressor surge would occur. The compressed gas is then discharged from compressor 26 into line 16. A vent line 32 provided with a valve 34 leads from discharge line 16. In the process herein, valve 34 is closed.

Power developed in expander 22, in excess of that necessary to drive compressor 26, is used to generate electricity via a motor/generator auxiliary system 30 linked to expander 22. It will be appreciated that when insufficient energy is developed in expander 22 to drive compressor 26 at the desired capacity, motor/generator 30 serves as an auxiliary driver to supply the power deficit.

As can be seen, all of the oxygen-containing gas (air) compressed in compressor 26 is introduced into regenerator 12, in the disclosed increased power generation system no compressed air being vented from the discharge of compressor 26 via line 32 and valve 34 as was normally done before. This condition prevails regardless of whether or not regenerator 12 is being operated under turndown conditions. Under such turndown conditions, air supplied by compressor 26 to regenerator 12 will be in excess of that required to effect combustion of the carbonaceous material on the spent catalyst in regenerator 12. In prior art processes employing axial flow gas compressors, it was common to permit the compressor to operate at a capacity which would prevent surging and simply vent the excess air to prevent afterburn rather than passing it through the regenerator since they could not tolerate the excess oxygen because they were not operating in the complete CO combustion mode. This resulted in a loss of energy from the system, to wit, the energy of the vented excess air. In the process herein, since the excess air is not vented, the energy is recovered continuously during turndown conditions in the expander-compressor set. As noted, and in the preferred case, the catalyst employed is the complete combustion type which ensures that the carbonaceous material is combusted to carbon dioxide in the dense phase zone of regenerator 12. Complete combustion catalyst gives excellent stability to the complete combustion mode of operation. Accordingly, the presence of excess oxygen in regenerator 12 under turndown conditions will not result in afterburn in the dilute phase zone of the regenerator, nor in the cyclone, due to the fact that little or no carbon monoxide is present in the regeneration gases leaving the dense phase zone. It is to be understood however that the process of the present invention is applicable to any regeneration process wherein substantially all of the carbon monoxide produced in the burning of the carbonaceous material is converted to carbon dioxide in the regeneration zone. Under such conditions, the presence of extra oxygen will insure no afterburning in the separators or, particularly in downstream equipment.

FIGS. 2, 3 and 4 are performance maps for a typical expander power recovery turbine/axial flow air compressor set. These maps show the areas in which the compressor and expander are operable.

FIG. 2 is a map of compressor brake horsepower versus compressor inlet flow rate. FIG. 3 is discharge pressure for the same compressor plotted against the same compressor inlet flow rate scale. In FIG. 3 is shown the surge line and a desired minimum operating line which is 10% above the surge line. In both FIG. 2 and FIG. 3, point D is the design operating point for the compressor. Point A on both figures represents the flow rate to satisfy the stoichiometric air requirement for a case corresponding to turn down to 75% of design. It is noted that the point is off the map and therefore inoperable on the compressor. The significance of the point is that it represents compressor surge. Point B on both figures lies on the desired minimum operating line and represents the minimum air flow desired from the axial compressor when the regeneration requirement is at point A. The difference between points A and B is the amount of air which would be vented to the atmosphere in a conventional process. The present process utilizes complete combustion catalyst and therefore this amount of air which would be vented in a conventional process is sent to the regenerator.

FIG. 4 is a map of typical expander power recovery turbine performance wherein the expander is coupled with the axial flow air compressor of FIGS. 2 and 3 as shown in FIG. 1. FIG. 4 is a plot of shaft horsepower versus flow rate for the expander. Points D, A and B correspond to points D, A and B respectively on FIGS. 2 and 3. Point D is the design operating point. The additional power recovered by the practice of the present invention is the difference in horsepower between points A and B on FIG. 4.

In the Example is shown power recovery on another expander power recovery turbine/axial flow air compressor set.

DETAILED DESCRIPTION OF THE PREFERRED EMBODIMENTS

In one embodiment the present invention is:

A method for increasing power recovery from a motor-generator/expander power recovery turbine/axial flow air compressor set, wherein the expander power recovery turbine drives the axial flow air compressor and either the expander power recovery turbine drives the motor-generator or the motor-generator supplements the drive of the axial flow air compressor; and the axial flow air compressor compresses and supplies air to a lower portion of a regenerator wherein is regenerated coke contaminated, partially deactivated catalyst in a fluidized catalytic cracking process wherein in the regenerator the catalyst is fluidized into a dense phase and a dilute phase by the upward flow of air from the lower portion of the regenerator and the air oxidizes the coke in the dense phase and the dilute phase and thereby regenerates the partially deactivated catalyst and produces a hot flue gas comprising oxides of carbon which hot flue gas drives the expander power recovery turbine which expander power recovery turbine drives the axial flow air compressor; wherein the fluidized catalytic cracking process is under a turndown condition wherein insufficient flow of coke contaminated, partially deactivated catalyst is provided to the regenerator; insufficient in that the air rate required to oxidize essentially all the coke is less than the air rate necessary to avoid axial flow air compressor surge, the method comprising:

(a) adjusting axial flow air compressor air rate set point to at least 10% above surge; thereby (b) increasing air rate to an amount in excess of regeneration requirement.

(c) flowing all air thereby compressed to the regenerator, and (d) by using complete combustion catalyst in the fluidized catalytic cracking process, oxidizing essentially all coke on the coke contaminated, partially deactivated catalyst to carbon dioxide in the dense phase of the regenerator and producing a hot flue gas essentially free of carbon monoxide, and (e) driving the expander power recovery turbine with all the hot flue gas produced, and thereby (f) driving the motor-generator and generating electricity.

In a second embodiment the invention is:

In a process for recovering power from motor-generator/expander power recovery turbine/axial flow air compressor set, wherein the expander power recovery turbine drives the axial flow air compressor and either the motor-generator supplements the drive of the axial flow air compressor or the expander power recovery turbine drives the motor-generator; and the axial flow air compressor compresses and supplies air to a lower portion of a regenerator wherein is regenerated coke contaminated, partially deactivated catalyst in a fluidized catalytic cracking process wherein in the regenerator the catalyst is fluidized into a dense phase and a dilute phase by the upward flow of air from the lower portion of the regenerator and the air oxidizes the coke in the dense phase and the dilute phase to oxides of carbon and thereby regenerates the deactivated catalyst and produces a hot flue gas which hot flue gas drives the power recovery turbine which power recovery turbine drives the axial flow air compressor; wherein the fluidized catalytic cracking process is under a turndown condition wherein insufficient flow of coke on partially deactivated catalyst is provided to the regenerator, insufficient in that the air rate required to oxidize essentially all the coke is less than the air rate necessary to avoid axial flow air compressor surge and wherein axial flow air compressor air rate set point is adjusted to an air rate above the rate at which compressor surge occurs, thereby driving the air compressor to compress excess air than necessary to oxidize all coke and wherein to avoid afterburn in the dilute phase, excess air is vented to the atmosphere wherein the improvement comprises:

(a) adjusting axial flow air compressor air rate set point to at least 10% above surge preferably 10% above surge to 125% of design, most preferably 10% above surge to 100% of design; thereby (b) compressing an amount of air in excess of regeneration requirements, (c) flowing all air compressed by the axial flow air compressor to the regenerator, and (d) using complete combustion catalyst in the fluidized catalytic cracking process thereby with all the air compressed and flowed, oxidizing essentially all coke on the coke contaminated catalyst to carbon dioxide in the dense phase of the regenerator and thereby producing a hot flue gas essentially free of carbon monoxide, and (e) driving the expander power recovery turbine with all the hot flue gas produced, and thereby (f) driving the motor-generator and generating electric power.

In a third embodiment, the invention is:

In a process which produces flue gas contaminants when spent hydrocarbon cracking catalysts having coke deposited thereon are regenerated, comprising (a) burning the coke on the spent catalyst in a regenerator to produce a catalyst having a coke on regenerated catalyst level less than 0.2 wt % and a flue gas containing less than 2.0 vol % carbon monoxide;

(b) expanding the flue gas from the regenerator through an expander power recovery turbine to drive an axial flow air compressor of a motor-generator/expander power recovery turbine/axial flow air compressor set to reduce the pressure thereof:

(c) recovering the energy produced from the expansion; wherein insufficient coke is supplied to the regenerator to produce sufficient flue gas to expand through the expander and to drive the axial flow air compressor at other than surge, wherein the improvement comprises:

(1) adjusting axial flow air compressor air rate to at least 10% above surge preferably 10% above surge to 125% of design most preferably 10% above surge to 100% of design rate; thereby (2) compressing an amount of air in excess of regeneration requirements, (3) flowing all air compressed by the axial flow air compressor to the regenerator, and (4) using complete combustion catalyst in the fluidized catalytic cracking process thereby with all the air compressed, oxidizing essentially all coke to carbon dioxide and thereby producing a flue gas reduced in carbon monoxide, and (5) driving the expander power recovery turbine with all the flue gas produced and thereby (6) driving the motor-generator and generating electric power.

As shown in FIG. 3, a point 10% above surge is the minimum flow operating point. The locus of minimum flow operating points is the desired minimum flow operating line. Ten percent above surge produces acceptable operational stability and reliability and very good power recovery. Operation below 10% above surge gives suspect reliability. The range of 10% above surge to 125% of design is the full range for operation. The range of 10% above surge to 100% of design yields the best power recovery with good operational stability.

This invention is better demonstrated by way of example.

EXAMPLE

The advantages of the present invention are seen from the tables below which set forth pertinent operating data for a typical FCCU power recovery system. Table I shows reactor-side conditions during design and turndown modes while Table II and III show power recovery system conditions during design and turndown modes:

TABLE I

| CASE | DESIGN | A/B(75% Turndown) | C/D(50% Turndown) |
|---|---|---|---|
| Feed Heater Outlet Temp. °F. | 525 | 525/561[1] | 498/659[1] |
| Riser Outlet Temp., °F. | 970 | 955[3] | 935[3] |
| Throughput Ratio | 1.14 | 1.14 | 1.14 |
| Cat. Circulation Rate, TPM | 48.0 | 34.4 | 21.8 |
| Reactor Top Pressure, psia | 39.7 | 39.7 | 39.7 |
| Coke Yield, WT. %, FF[2] | 5.30 | 5.30 | 5.30 |
| Gas Oil Conversion, Vol % FF | 75.0 | 75.0 | 75.0 |

[1]Feed preheat temperature increased in B and D to maintain catalyst/oil weight ratio constant while regenerator bed temperature drops due to presence of excess air.
[2]Fresh Feed
[3]Riser outlet temperature lowered to maintain constant conversion while reducing FF rate below design.
[4]400° F. ASTM.

TABLE II

| CASE | DESIGN | A(75% Turndown) | B(75% Turndown) |
|---|---|---|---|
| Air Rate to Regen. Mlbs/hr | 604.67 | 453.5 | 521.8[1] |
| Air Rate From Blower Mlbs/hr | 604.67 | 521.8 | 521.8 |
| Air Required for Combustion Mlbs/hr | 604.67 | 453.5 | 453.5 |
| Air Vented Mlbs/hr | 0 | 68.26 | 0 |
| Regen. Bed Temp., °F. | 1325 | 1325 | 1312 |
| Regen. Top Temp., °F. | 1340 | 1340 | 1327 |
| Regen. Top Pressure, psia | 44.7 | 44.7 | 44.7 |
| Air Blower Discharge Pressure, psia | 50.53 | 49.66 | 50.02 |
| Expander Inlet Pressure, psia | 38.53 | 30.55 | 33.77 |
| Expander Inlet Temperature, °F. | 1285 | 1285 | 1285 |
| Expander HP | 18,400 | 11,500 | 14,260 |
| Blower HP | 16,400 | 13,893 | 13.994 |
| HP Generated | 2000 | (2393)[2] | 266 |

TABLE II-continued

| CASE | DESIGN | A(75% Turndown) | B(75% Turndown) |
|---|---|---|---|
| $O_2$ in Flue Gas, Vol % | 1.0 | 1.0 | 3.7 |

[1] Blower performance map indicates that air rate from blower under these conditions must be 10% of design rate in order to be 10% away from surge line. This number is slightly off due to its being calculated in heat and material balance program basis input value for $O_2$ in flue gas.
[2] Value in parentheses indicates HP deficit made up by motor.

TABLE III

| CASE | DESIGN | C(50% Turndown) | D(50% Turndown) |
|---|---|---|---|
| Air Rate to Regen., Mlbs/hr | 604.67 | 302.33 | 524.9[1] |
| Air Rate from Blower, Mlbs/hr | 604.67 | 524.9 | 524.9 |
| Air Required for Combustion, Mlbs/hr | 604.67 | 302.33 | 302.33 |
| Air Vented Mlbs/hr | 0 | 222.6 | 0 |
| Regen. Bed Temp., °F. | 1325 | 1325 | 1258 |
| Regen. Top Temp., °F. | 1340 | 1340 | 1273 |
| Regen. Top Pressure, psia | 44.7 | 44.7 | 44.7 |
| Air Blower Discharge Pressure, psia | 50.53 | 49.03 | 50.04 |
| Expander Inlet Pressure, psia | 38.53 | (2) | 33.03 |
| Expander Inlet Temp., °F. | 1285 | (2) | 1273 |
| Expander HP | 18,400 | (2) | 13,524 |
| Blower HP | 16,400 | (2) | 14,097 |
| HP Generated | 2000 | (2) | (573)[3] |
| $O_2$ in Flue Gas, Vol % | 1.0 | 1.0 | 9.6 |

[1] Blower performance map indicates that air rate from blower under these conditions must be 86.8% of design rate in order to be 10% from surge line.
[2] Expander inlet volume so low that these conditions are far below range covered on expander performance map. Thus, this case not workable.
[3] Value in parentheses indicates HP deficit made up by motor.

As seen with reference to Table II, Case A, a 75% turndown fresh feed rate, the excess air required by the compressor to keep it at a safe distance from the surge point is vented, e.g. valve 34 is open, rather than being passed into the regenerator. Under such circumstances there is a significant deficiency between the expander horsepower generated (11,500) and the blower horsepower requirements (13,893). The deficiency requires that an auxiliary driver, such as for example motor generator 30, be employed. However, with reference to Case B in Table II, also at 75% turndown fresh feed rate, it can be seen that when the excess compressed air is put through the regenerator, the recovered horsepower (14,260) exceeds the blower horsepower requirements (13,994).

With reference to Table III, Case D represents a situation, at a 50% turndown fresh feed rate, wherein the excess air required for combustion is put through the regenerator. While there is a deficit of 573 horsepower which must be supplied by an auxiliary driver, it should be noted that even under such severe turndown conditions very little auxiliary power is required. In Case C, which also depicts 50% turndown conditions, the excess air required for combustion is vented. As can be seen under such circumstances, the expander inlet volume is so low that the system is inoperable.

As the above data shows, the present invention provides a process in which maximum recovery of energy from a FCCU can be achieved from a continuous and steady flow of hot flue gas. Furthermore, the process permits the use of high efficiency axial gas compressors without resorting to venting of the compressor discharge, in turndown conditions, to prevent surging or pumping of the compressor. An additional advantage of the process of the present invention is that by putting the excess air through the regenerator rather than venting, improved air distribution in the regenerator dense phase bed is achieved.

While the invention has been described with considerable particularity, it is to be understood that many changes and modifications may be made in the process without departing from the spirit and scope of the invention. Accordingly, it is intended that the scope of the invention be limited only by the claims which follow.

What is claimed is:

1. A method for increasing power recovery from a motor-generator/expander power recovery turbine/axial flow air compressor set, wherein the expander power recovery turbine drives the axial flow air compressor and either the expander power recovery turbine drives the motor-generator or the motor-generator supplements the drive of the axial flow air compressor; and the axial flow air compressor compresses and supplies air to a lower portion of a regenerator wherein coke contaminated, partially deactivated catalyst is regenerated in a fluidized catalytic cracking process wherein in the regenerator the catalyst is fluidized into a dense phase and a dilute phase by the upward flow of air from the lower portion of the regenerator and the air oxidizes the coke in the dense phase and the dilute phase and thereby regenerates the partially deactivated catalyst and produces a hot flue gas comprising oxides of carbon which hot flue gas drives the expander power recovery turbine which expander power recovery turbine drives the axial flow air compressor; wherein the fluidized catalytic cracking process is under a turndown condition wherein insufficient flow of coke contaminated, partially deactivated catalyst is provided to the regenerator; insufficient in that the air rate required to oxidize essentially all the coke is less than the air rate necessary to avoid axial flow air compressor surge, the method comprising:
    (a) adjusting axial flow air compressor air rate set point to a speed about 10% above surge; thereby
    (b) increasing air rate to an amount in excess of regeneration requirement,
    (c) flowing all air thereby compressed to the regenerator, and
    (d) using complete combustion catalyst in the fluidized catalytic cracking process, thereby oxidizing essentially all coke on the coke contaminated, partially deactivated catalyst to carbon dioxide in the dense phase of the regenerator and producing a hot flue gas essentially free of carbon monoxide, and
    (e) driving the expander power recovery turbine with all the hot flue gas produced, and thereby
    (f) driving the motor-generator and generating electricity.

2. In a process for recovering power from motor-generator/expander power recovery turbine/axial flow air compressor set, wherein the expander power recovery turbine drives the axial flow air compressor and either the motor-generator supplements the drive of the axial flow air compressor or the expander power recovery turbine drives the motor-generator; and the axial flow air compressor compresses and supplies air to a lower portion of a regenerator wherein coke contaminated, partially deactivated catalyst is regenerated in a fluidized catalytic cracking process wherein in the regenerator the catalyst is fluidized into a dense phase and a dilute phase by the upward flow of air from the lower portion of the regenerator and the air oxidizes the coke in the dense phase and the dilute phase to oxides of carbon and thereby regenerates the deactivated catalyst and produces a hot flue gas which hot flue gas drives the power recovery turbine which power recovery turbine drives the axial flow air compressor; wherein the fluidized catalytic cracking process is under a turndown condition wherein insufficient flow of coke on partially deactivated catalyst is provided to the regenerator, insufficient in that the air rate required to oxidize essentially all the coke is less than the air rate necessary to avoid axial flow air compressor surge and wherein axial flow air compressor air rate set point is adjusted to an air rate above the rate at which compressor surge occurs, thereby driving the air compressor to compress more air than necessary to oxidize all coke and wherein to avoid afterburn in the dilute phase, excess air is vented to the atmosphere wherein the improvement comprises:
  (a) adjusting axial flow air compressor air rate set point to about 10% above surge; thereby
  (b) compressing an amount of air in excess of regeneration requirements,
  (c) flowing all air compressed by the axial flow air compressor to the regenerator, and
  (d) using complete combustion catalyst in the fluidized catalytic cracking process thereby with all the air compressed and flowed, oxidizing essentially all coke on the coke contaminated catalyst to carbon dioxide in the dense phase of the regenerator and thereby producing a hot flue gas essentially free of carbon monoxide, and
  (e) driving the expander power recovery turbine with all the hot flue gas produced, and thereby
  (f) driving the motor-generator and generating electric power.

3. In a process which produces flue gas contaminants when spent hydrocarbon cracking catalysts having coke deposited thereon are regenerated, comprising
  (a) burning the coke on the spent catalyst in a regenerator to produce a catalyst having a coke on regenerated catalyst level less than 0.2 wt % and a flue gas containing less than 2.0 vol % carbon monoxide;
  (b) expanding the flue gas from the regenerator through an expander power recovery turbine to drive an axial flow air compressor of a motor-generator/expander power recovery turbine/axial flow air compressor set to reduce the pressure thereof;
  (c) recovering the energy produced from the expansion;
wherein insufficient coke is supplied to the regenerator to produce sufficient flue gas to expand through the expander and to drive the axial flow air compressor at other than surge, wherein the improvement comprises:
  (1) adjusting axial flow air compressor air rate to about 10% above surge; thereby
  (2) compressing an amount of air in excess of regeneration requirements,
  (3) flowing all air compressed by the axial flow air compressor to the regenerator, and
  (4) using complete combustion catalyst with the spent catalyst in the fluidized catalytic cracking process thereby with all the air compressed, oxidizing essentially all coke to carbon dioxide and thereby producing a flue gas reduced in carbon monoxide, and
  (5) driving the expander power recovery turbine with all the flue gas produced and thereby
  (6) driving the motor-generator and generating electric power.

* * * * *